United States Patent [19]

Ishizaki et al.

[11] Patent Number: 5,748,894
[45] Date of Patent: May 5, 1998

[54] COOPERATIVE INFORMATION PROCESSING METHOD AND APPARATUS UTILIZING LOCAL PROGRAM

[75] Inventors: Takeshi Ishizaki; Kenjiro Mori, both of Sagamihara; Yoshiyuki Nakayama; Chiho Kitahara, both of Kawasaki; Masami Kameda, Yokohama; Tomomi Suzuki, Ebina, all of Japan

[73] Assignee: Hitachi, Ltd., Tokyo, Japan

[21] Appl. No.: 231,517

[22] Filed: Apr. 22, 1994

Related U.S. Application Data

[63] Continuation-in-part of Ser. No. 795,828, Nov. 21, 1991, Pat. No. 5,379,374, and a continuation-in-part of Ser. No. 968,046, Oct. 28, 1992, abandoned.

[30] Foreign Application Priority Data

Apr. 23, 1993 [JP] Japan ................. 5-097868

[51] Int. Cl.$^6$ ...................................... G06F 3/14
[52] U.S. Cl. ...................... 395/200.04; 395/330
[58] Field of Search ...................... 395/200, 375, 395/650, 200.04, 330

[56] References Cited

U.S. PATENT DOCUMENTS

| | | | |
|---|---|---|---|
| 4,558,413 | 12/1985 | Schmidt et al. | 395/619 |
| 4,712,189 | 12/1987 | Mohri | 395/705 |
| 4,809,170 | 2/1989 | Leblang et al. | 345/703 |
| 4,974,173 | 11/1990 | Stefik et al. | 395/331 |
| 5,008,853 | 4/1991 | Bly et al. | 395/331 |
| 5,129,056 | 7/1992 | Eagen et al. | 395/341 |
| 5,136,716 | 8/1992 | Harvey et al. | 395/200.06 |
| 5,201,033 | 4/1993 | Eagen et al. | 395/331 |
| 5,206,934 | 4/1993 | Naef, III | 395/200.04 |
| 5,241,625 | 8/1993 | Epard et al. | 395/502 |
| 5,293,619 | 3/1994 | Dean | 395/682 |
| 5,329,619 | 7/1994 | Page et al. | 395/200.01 |
| 5,379,374 | 1/1995 | Ishizaki et al. | 395/331 |

OTHER PUBLICATIONS

Ahuja, S.R., J.R. Ehsor and S.E. Lucco, "A Comparison of Application Sharing Mechanism . . . " Apr. 25–27, 1990.

*Primary Examiner*—Parshotam S. Lall
*Assistant Examiner*—Kenneth R. Coulter
*Attorney, Agent, or Firm*—Antonelli, Terry, Stout & Kraus, LLP

[57] ABSTRACT

A cooperative information processing system in which a cooperative execution application program can utilize an auxiliary application program that is being executed locally. The communication control program has the request conversion unit, the input conversion unit and the server-dependent information table. The communication control program utilizes the server-dependent information table to interpret the format of an inter-application message between the sites and carries out a proper conversion. Thus, communication between the cooperative execution application program and the auxiliary application program locally executed at a specific site, such as for example, the Japanese inputting front end program, is made possible.

11 Claims, 14 Drawing Sheets

FIG. 4

|  | SERVER 1 | SERVER 2 | ------- | SERVER N |
|---|---|---|---|---|
| 400 WINDOW IDENTIFIER BASE | W1 | W2 | ------- | WN |
| 410 PROGRAM IDENTIFIER | P11 | P12 | ------- | P1N |
|  | Q21 | Q22 | ------- | Q2N |
| 420 MESSAGE TYPE IDENTIFIER | M11 | M12 | ------- | M1N |
|  | M21 | M22 | ------- | M2N |
|  | ⋮ | ⋮ |  |  |
|  | ML1 | ML2 | ------- | MLN |

390

COOPERATIVE INFORMATION PROCESSING METHOD AND APPARATUS UTILIZING LOCAL PROGRAM

CROSS-REFERENCE TO RELATED APPLICATIONS

This is a Continuation-In-Part Application of
(1) U.S. Ser. No. 07/795,828 filed Nov. 21, 1991, now U.S. Pat. No. 5,379,374 entitled "Collaborative Information Processing System and Workstation", and
(2) U.S. Ser. No. 07/968,046 filed Oct. 28, 1992, now abandoned entitled "Joint Information Processing System and Control Method", both assigned to the present assignee. The disclosure of these applications is incorporated herein by reference.

BACKGROUND OF THE INVENTION

The present invention relates to a cooperative information processing system which enables a plurality of participants in remote distributed locations to cooperatively execute the same application program by using a communication network, and relates more particularly, to a processing system which enables the participants to utilize auxiliary programs (local programs), such as, for example, Japanese inputting front end programs, such as "HITACHI Wnn", and window manager programs, on their own computers.

There have been developed systems for assisting a cooperative work by connecting a plurality of computers through a communication network. As examples of such systems as described, there are references, "S.R.Ahuja, J. R. Ensor and S. E. Lucco: A Comparison of Application Sharing Mechanisms in Real-time Desktop Conference Systems, Proc. of the ACM Conference on Office Information Systems, April 25–27, 1990, Cambridge, Mass.", U.S. Ser. No. 07/968,046 and U.S. Ser. No. 07/795,828.

When an application program is being executed cooperatively under the control of a communication program, a request message issued by the application program is once received by the communication control program and is then broadcasted to window server programs of all the participants. When an input has been made by some participant, a corresponding event message is received by the communication control program and this event message is then passed to the application program.

A computer which executes the application program is called a primary site and the window server program on this computer is called a primary server. Computers of other participants are called secondary sites and the window server programs on these computers are called secondary servers.

In this case, when a request message is sent to the servers (secondary servers) other than the primary servers or when an event message received from a secondary server is sent to the application program, the communication control program properly converts server dependent information such as window identifiers included in the request message or the event message.

According to the conventional communication control program, however, there has been a problem in that, although a normal request message and an event message defined by the window system can be properly converted, an inter-application program communication message transmitted between the application programs cannot be converted properly.

This is because the contents of the message transmitted between the application programs are defined by the application programs which actually exchange information and these contents cannot be known by other programs in general. Accordingly, it is not possible for the communication control program to convert server dependent information included in the event message and the request message.

As a result, there has been such inconvenience during a cooperative work that it is not possible to input Japanese from a secondary site or it is not possible to transmit information to the application program through a window manager.

SUMMARY OF THE INVENTION

It is an object of the present invention to provide a cooperative information processing system which makes it possible to freely input from any site to an application program which is being executed cooperatively. In other words, it is an object of the present invention to provide a cooperative information processing system in which an input from any one of the sites in a cooperative work is effected to all other sites.

In general, it is not possible to know inter-application communication messages of all the application programs. However, a format of an inter-application program communication message of specific application programs, such as auxiliary programs like a Japanese inputting front end program which is being utilized by many application programs and a window manager program for controlling a position and size of a window, are made open to the public. Thus, it is possible to know a communication timing and a communication format when server dependent information is transmitted between the application programs.

Then, communication control means for managing a correspondence relationship of server dependent information included in a message having known format of inter-application program communication, is provided. In this case, the correspondence relationship shows how server dependent information is to be expressed on each window server that is connected to the communication control program. The communication control unit has a function of interpreting the server dependent information included in the communication message and properly converting the server dependent information in response to a transmission originating server, based on the information, given in advance, for showing the correspondence relationship in each server of the server dependent information.

The communication control program used in the present invention is designed to be able to recognize and carry out proper conversion of, not only a request message and an event message of which contents have been defined in advance according to a window system, but also a communication message transmitted between the application programs.

With the above-described arrangement, it becomes possible for the application program under the cooperative execution to correctly communicate with an auxiliary program which is being operated locally.

As a detailed example, when the auxiliary program utilized by the cooperative execution application program is a Japanese inputting front end program, the following processing is carried out.

The application program utilizing the Japanese inputting front end program connects itself with the Japanese inputting front end program. In this case, an identifier, a position and size of a window which are necessary for a translation operation are transmitted to the Japanese inputting front end program, by using the inter-application program communication message.

The application program transmits this information to the window server program as an inter-application communication message transmission request, and the window server program transmits the message to the Japanese inputting front end program.

When the Japanese inputting front end program transmits a translated string after carrying out a Kana-Kanji translation to the application program, the Japanese inputting front end program transmits the information through an opposite route. In other words, the Japanese inputting front end program transmits the translated string to the window server program as an inter-application communication message transmission request, and the window server program transmits the message to the application program. In this case, when the identifiers of the message transmission destination to which the translated string is to be transmitted and the message type identifiers are properly converted so that the application program can interpret these identifiers, the application program can securely receive the translated string.

BRIEF DESCRIPTION OF THE DRAWINGS

FIG. 4 is a configuration diagram of the server dependent information table shown in FIG. 3.

DESCRIPTION OF THE PREFERRED EMBODIMENT

Figure 1:
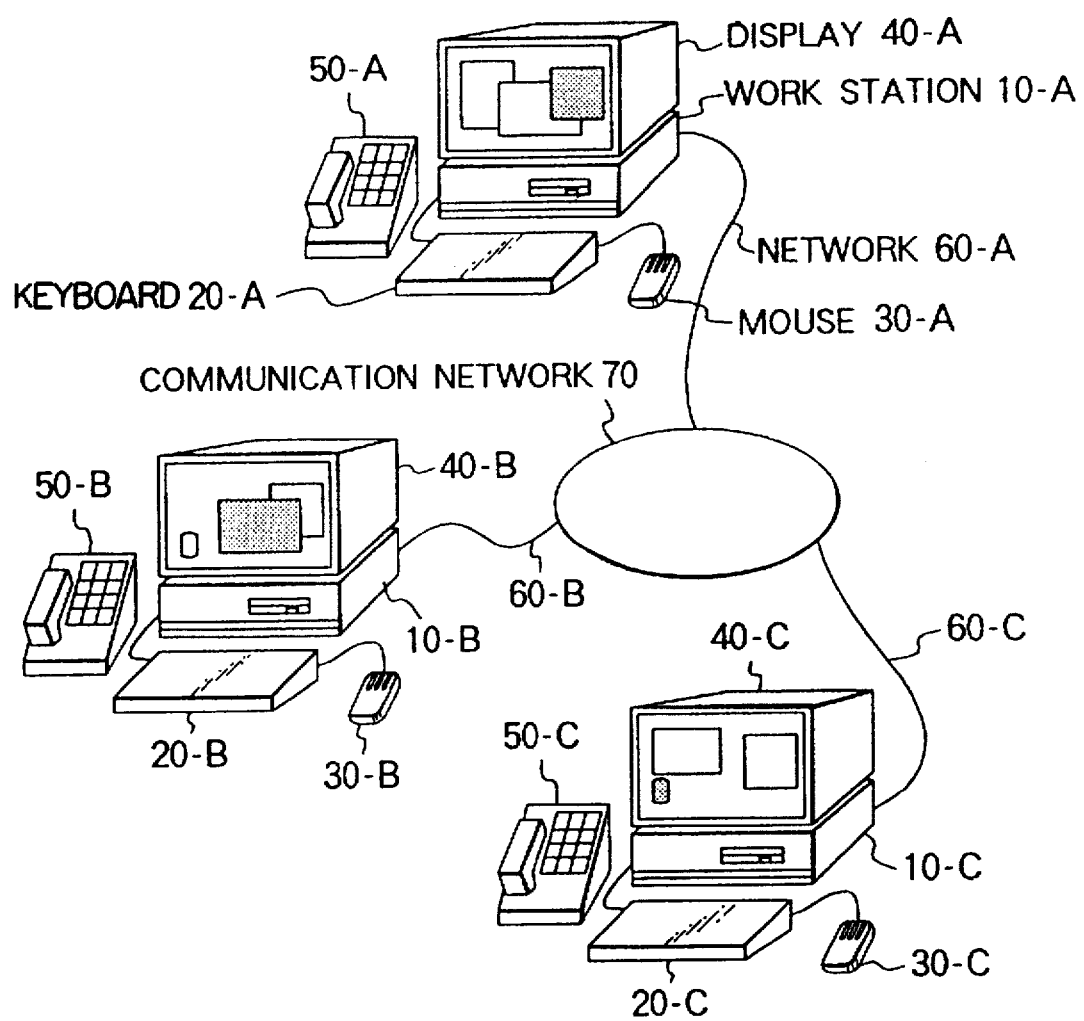
FIG. 1 is a diagram for showing one example of the configuration of the electronic conference system to which the present invention is applied.

An electronic conference system which is one embodiment of the present invention will be explained below. FIG. 1 is a diagram for showing a schematic view of the electronic conference system of the present embodiment. In this embodiment, three computers 10-A, 10-B and 10-C are connected with each other through a network 70. Each computer is equipped with a telephone set 50 to support communications in voice at a conference. In FIG. 1, both the telephone sets 50 and the computers 10 are connected to the same network 70, but the telephone sets 50 and the computers 10 may also be connected to separate networks.

An ISDN (Integrated Services Digital Network) which can connect a plurality of machines with the same line, for example, is a convenient system because it is possible to carry out both voice communication by telephone and digital communication between computers at the same time by using one line in this network. On the other hand, in the case of data communication within a company, for example, the data communication is executed by using a LAN (Local Area Network) and voice communication using telephones may be executed by using telephone lines.

For the telephone set 50 itself, it is of course possible to use a hands-free telephone set which allows to execute communication without holding a receiver or a telephone set incorporating an echo canceler, instead of a normal telephone set as described in the present embodiment.

The computers 10 connected as explained in the present embodiment do not need to be the same type of machine but may be of different types or of different manufacturers if the computers 10 meet predetermined requirements.

To each of the computers, input devices such as a mouse 30 and a keyboard 20 and a display unit such as a CRT display 40 are connected.

On the computers 10 connected with the network 70, it is possible to cooperatively execute the same application program by a plurality of participants.

Figure 2:
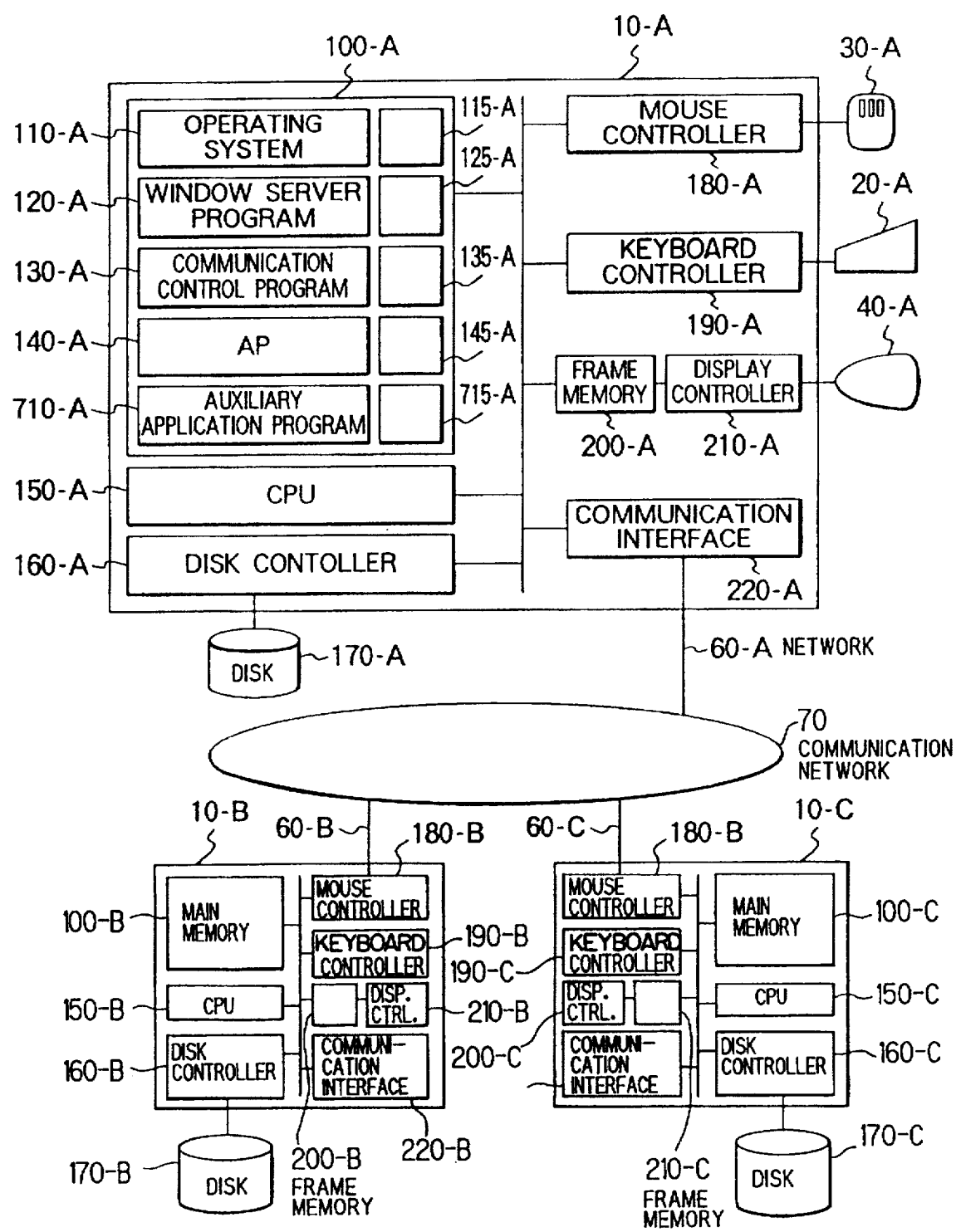
FIG. 2 is a hardware configuration diagram of the electronic conference system which becomes one embodiment of the present invention.

FIG. 2 is a configuration diagram of the hardware of the computers 10 used in the present embodiment. An input from the mouse 30 is applied through a mouse controller 180. An input from the keyboard 20 is applied through a keyboard controller 190.

An application program 140 sends a message to a window server program 120 to make a display on the display 40. The server program writes data on a frame memory 200 and a display controller 210 reads the contents of the frame memory 200 to make a display of the contents on the display 40.

The computer 10-A is connected to the other computers 10-B and 10-C through a communication interface 220-A and can communicate with these computers through the network 70.

A CPU 150 can read and execute instruction codes of an operating system 110, a window server program 120, a communication control program 130, a general application program 140 and an auxiliary program 710 which are stored in a main memory and data (115, 125, 135, 145 and 715) that are being managed by each program. The auxiliary program 710 is a Japanese inputting front end program, for example. When necessary, it is also possible to read and write data on a disk 170 by controlling a disk controller 160.

Figure 3:
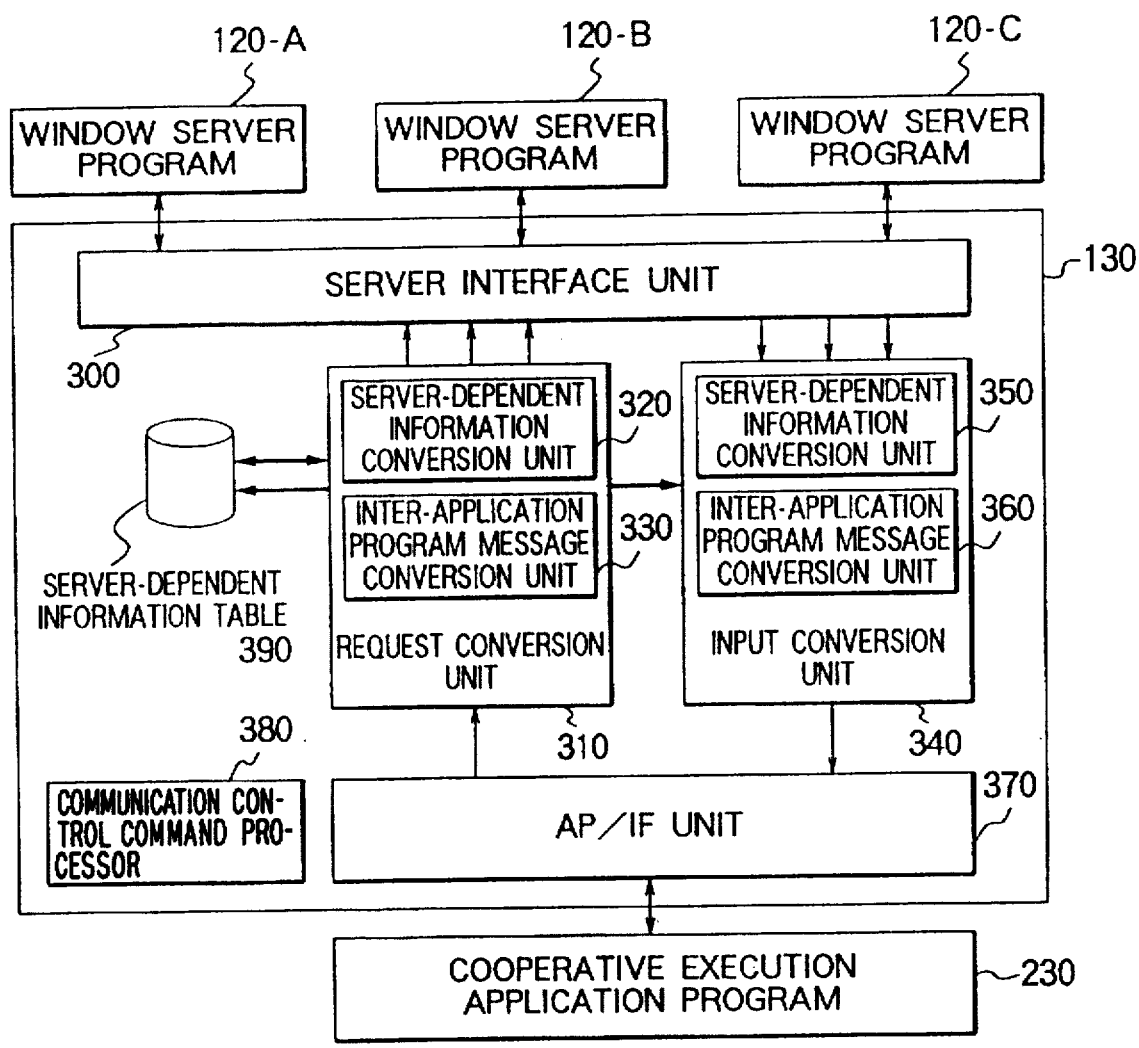
FIG. 3 is a software configuration diagram in the embodiment shown in FIG. 2.

FIG. 3 shows a configuration of the software of the communication control program 130 of the electronic conference system. An application program interface unit 370 receives a request message from a cooperative execution application program 230 and transmits an event message to the application program 230.

A server interface unit 300 is connected to a plurality of window servers 120-A, 120-B and 120-C corresponding to the participants of the conference, and transmits a request message of the application program 230 to the window server 120 and receives an event message transmitted from the window server 120 to the application program 230.

A request conversion unit 310 includes a server-dependent information conversion unit 320 and an inter-application message conversion unit 330. The server-dependent information conversion unit 320 manages correspondence relationship of server-dependent information which differs depending on the server, such as a window identifier included in the request message, and has a function for properly converting the service-dependent information included in the request message according to the destination server. The server-dependent information conversion unit 320 can convert only the request message which has been defined in advance by the window system.

The inter-application message conversion unit 330 has a function for interpreting and converting the inter-application message, which is one of the unique functions of the present invention. In other words, when a request message is a request for transmitting an inter-application message to other application programs or to the auxiliary program 710, the inter-application message conversion unit 330 converts the server-dependent information included in this message according to the type of message.

An input conversion unit 340 includes a server-dependent information conversion unit 350 and an inter-application message conversion unit 360, in the manner similar to the request conversion unit 310.

The server-dependent information conversion unit 350 manages the correspondence relationship of server-dependent information which is differs depending on the server, such as a window identifier included in the event message, and has a function for properly converting the service-dependent information included in the event message according to the destination server. The server-dependent information conversion unit 350 can convert only the event message which has been defined in advance by the window system.

The inter-application message conversion unit 360 has a function for interpreting and converting the inter-application message, which is one of the unique functions of the present invention. In other words, when an event message is a message for transmitting an inter-application message from other application programs or from the auxiliary program 710, the inter-application message conversion unit 330 converts the server-dependent information included in this message according to the type of message.

The input conversion unit 340 and the request conversion unit 310 have a server-dependent information table 390 which stores server-dependent information such as an window identifier defined in the window system and a correspondence relationship in each server 120 of server-dependent information (such as a program identifier and a message type identifier) included in the inter-application message used for communication between the application programs.

FIG. 4 shows an example of the configuration of the server-dependent information table 390. The server-dependent information table 390 has entries by the number of window server programs connected to the server interface unit. Each entry stores a window identifier base 400, a program identifier 410 and a message type identifier 420 in each server.

In the example of FIG. 4, W1 to WN designate window identifier bases of respective servers, P11 to P1N program identifiers of a local program 710 in the servers, Q21 to Q2N designate program identifiers of the cooperative execution application program 140 in the servers and Mi1 to MiN (i=1 to L) designate message identifiers of a message i in the servers. It is assumed that L kinds of messages are used in this case.

In the present embodiment, only one cooperative execution application program 140 is shown, but it is needless to mention that a plurality of application programs can also be cooperatively executed at the same time. In this case, the server-dependent information table 390 is produced by the number corresponding to the number of the application program.

A communication control command processing unit 380 receives a command issued by a user interface program for controlling the operation of the communication control program 130 and transmitted to the communication control program 130, and executes the corresponding processing. For example, when the communication control command processing unit 380 has received a communication control program terminating command, the unit executes the termination processing to terminate the communication control program 130.

Figure 5:
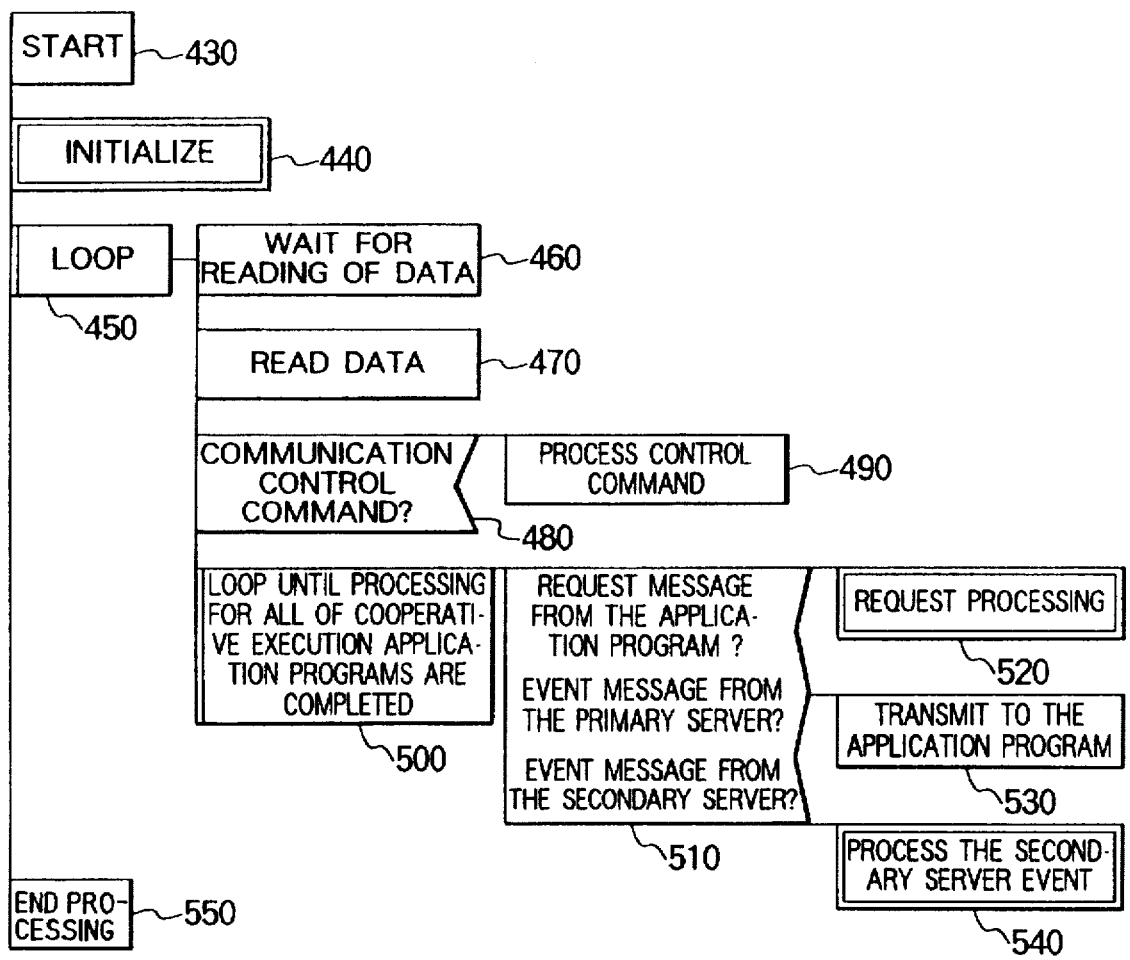
FIG. 5 is a diagram for showing the processing of the communication control program shown in FIG. 3.

FIG. 5 shows a processing flow of the communication control program 130. At first, an initialization is carried out (step 440), then the processing within the loop is repeated (step 450) and the processing is ended (step 550). The processing within the loop starts after data to be read has been generated by the application program interface unit, the server interface unit, or the communication control command processing unit (step 460).

When data has been generated, the generated data is read (step 470). A decision is made whether the data that has been read is a communication control command or not (step 480), and if the data that has been read is a communication control command, the command is processed (step 490).

Next, the processing is repeated until processings for all application programs that are being executed cooperatively (step 500) are completed. The kind of a message that has been read is decided (step 510), and if the message that has been read is a request message from the application program 140, the request message is processed (step 520). If the data that has been read is an event message from the primary server, the data is directly transmitted to the application program (step 530). If the message that has been read is an event message from a secondary server, the processing of the event message from the secondary server is carried out (step 540).

Figure 6:
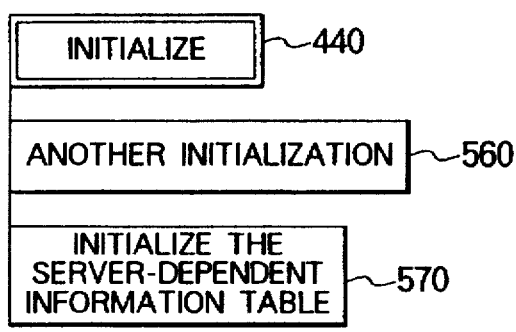
FIG. 6 is a diagram for showing the flow of the initialization processing of the communication control program shown in FIG. 5.

FIG. 6 shows the flow of an initialization. At first, other initialization necessary for the communication control program 130 is carried out (step 560), and then the server-dependent information table is initialized (step 570).

Figure 7:
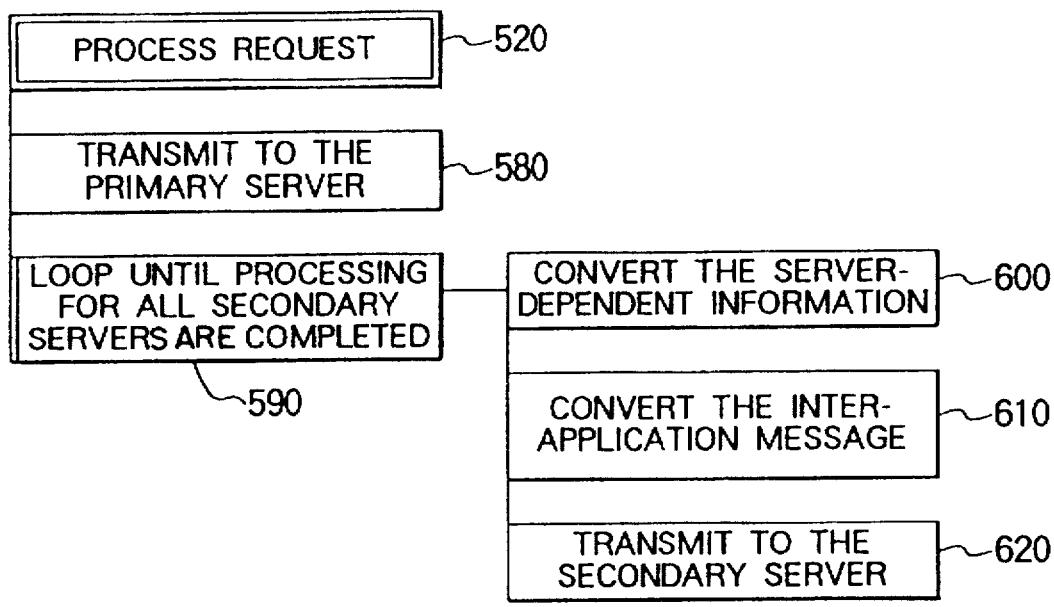
FIG. 7 is a diagram for showing the flow of the request message processing of the communication control program shown in FIG. 5.

FIG. 7 shows a flow of the request message processing 520 in the inter-application message unit 330. At first, a received request message is directly transmitted to the primary server through the server interface unit 300 (step 580). Then, the next processing is repeated by the number of secondary servers that have been connected (step 590). The server-dependent information conversion unit 320 converts the server-dependent information included in the request message (step 600). Next, the inter-application message conversion unit 330 executes the conversion processing of the inter-application message (step 610). The request message after the conversion is transmitted to the secondary servers through the server interface unit 300 (step 620).

Figure 8:
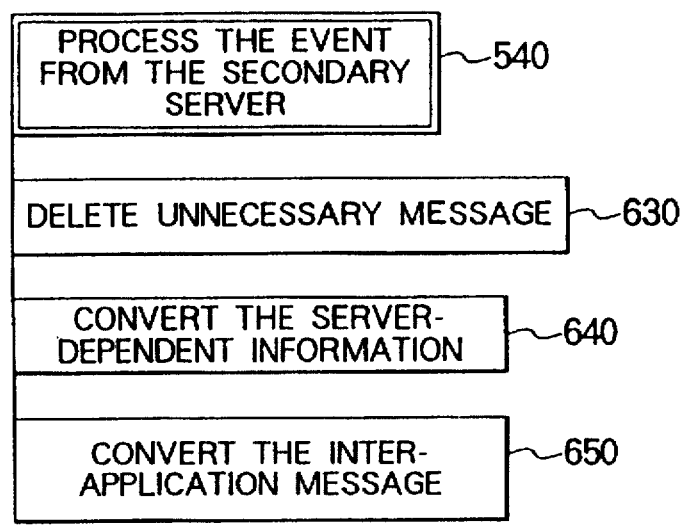
FIG. 8 is a diagram for showing the flow of the event message processing from the secondary server of the communication control program shown in FIG. 5.

FIG. 8 shows a flow of the event message processing 540 from the secondary server in the inter-application message conversion unit 360. At first, messages which are not necessary to be sent to the application program 230 are deleted (step 630). Those messages which are not to be sent to the application program 230 include, for example, reply messages in inquiries to inquiries to the servers 120, etc. (Only reply messages from the primary server are to be sent to the application program.) Next, the server-dependent information conversion unit 350 converts the server-dependent information included in the event message (step 640). Then, the inter-application message conversion unit 360 executes the conversion processing of the inter-application message (step 650).

FIGS. 9 to 12 are diagrams for showing the cooperative execution system of the application program by the communication control program 130.

Figure 9:
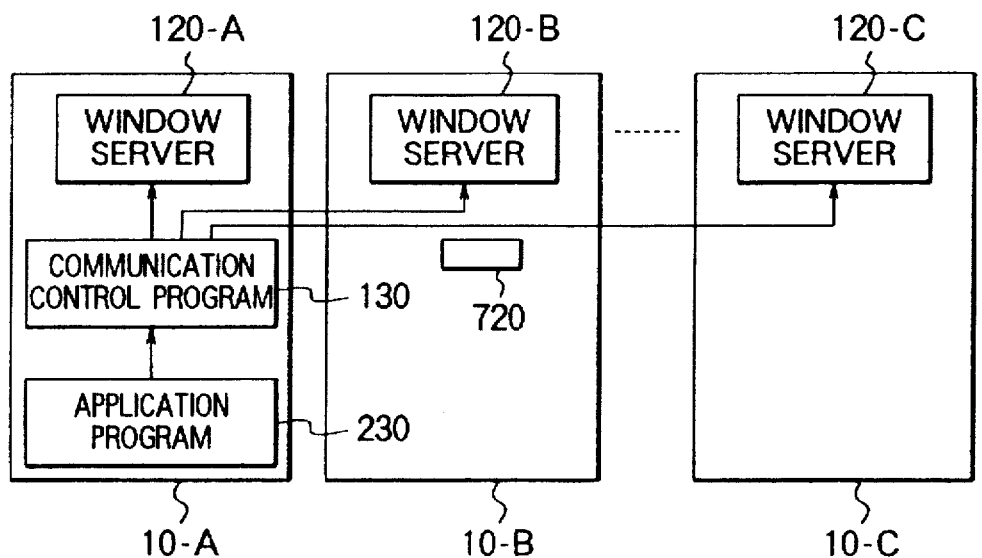
FIG. 9 is a diagram for showing the flow of the request message when the application program is being executed cooperatively.

FIG. 9 shows a flow of a request message 720 (FIG. 10) issued by an application program 230. The request message 720 issued by the application program 230 is not directly sent to the server 120-A but is received by the communication control program 130. Then, the above-described processing is executed and the request message 720 is transmitted to the servers 120-A, 120-B and 120-C. With this arrangement, the same window is displayed on all of the connected computers 10-A, 10-B and 10-C.

Since the application program 230 is actually being operated on the computer 10-A of the participant A, this computer 10-A is the primary site. The computers 10-B and 10-C of the participants B and C are the secondary sites.

Figure 11:
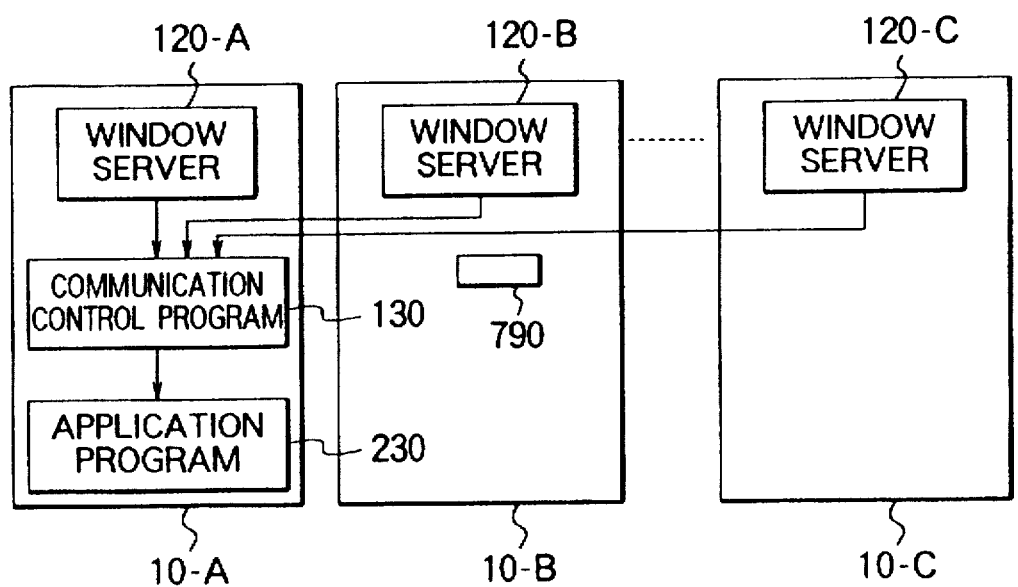
FIG. 11 is a diagram for showing the flow of the event message when the application program is being executed cooperatively.

FIG. 11 shows a flow of an event message 790 (FIG. 12) issued by the window server 120. The event message issued by each server is not sent directly to the application program 230 but is sent to the communication control program 130. After the above-described processing is carried out by the communication control program 130, the event message 790 is transmitted to the application program 230. Thus, it is possible to operate the application program 230 by inputting data from any server.

Figure 13:
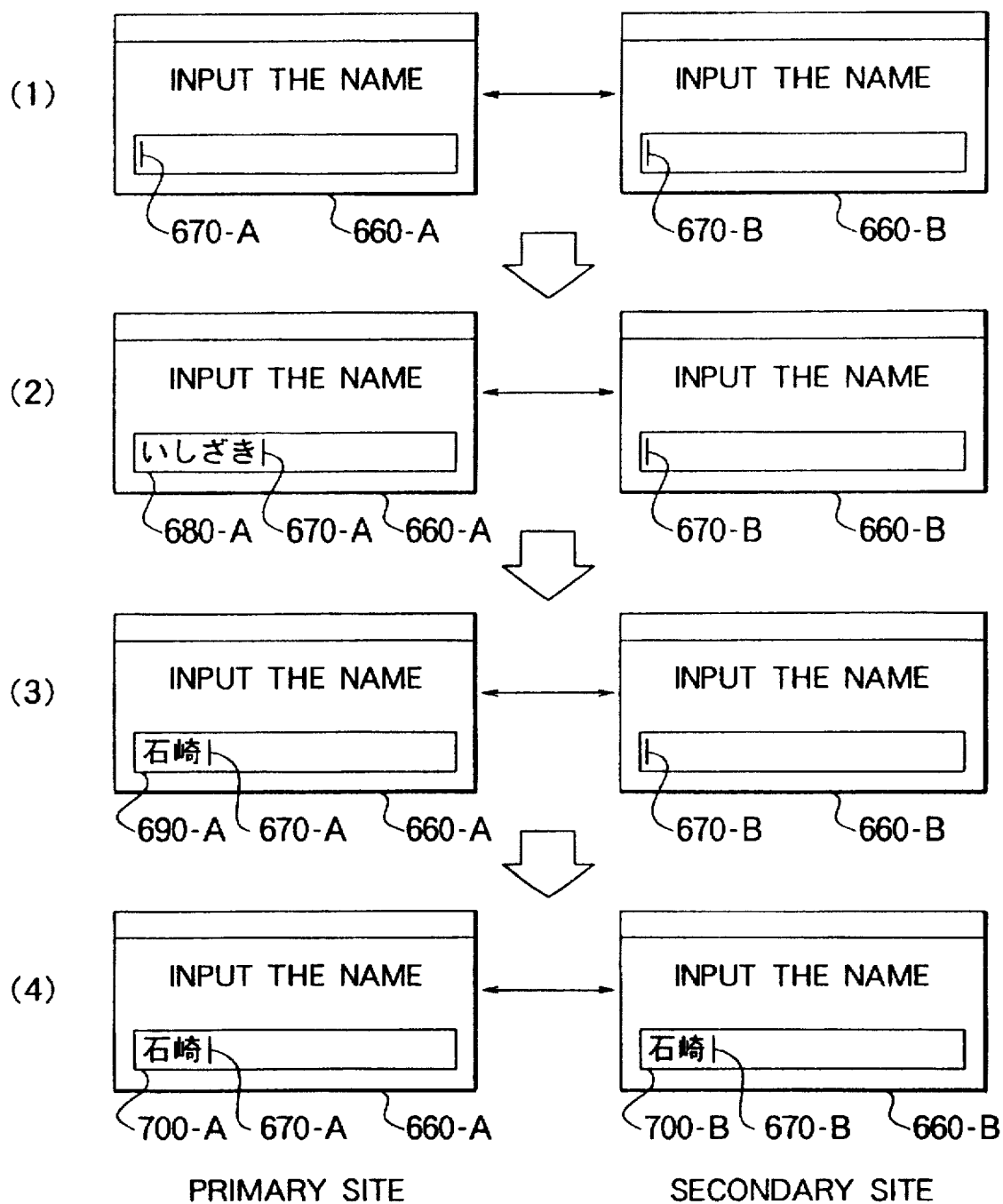
FIG. 13 is a diagram for showing the display when Japanese inputting is being made at the primary site when the application program is being executed cooperatively.
Figure 14:
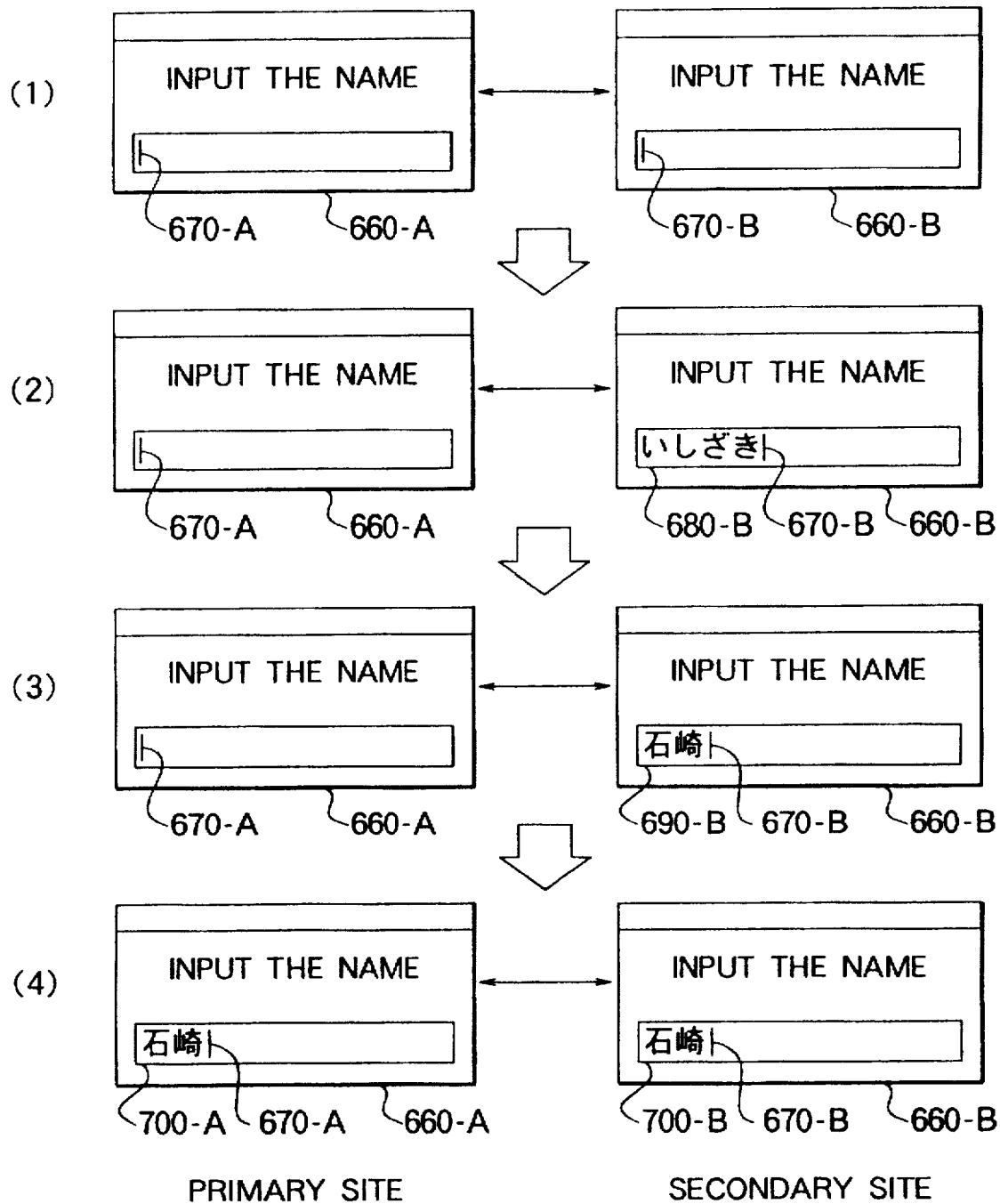
FIG. 14 is a diagram for showing the display when Japanese inputting is being made at the secondary site when the application program is being executed cooperatively.

FIGS. 13 and 14 show examples of an interlocked operation of the Japanese input operation in the electronic conference system according to the present embodiment. FIG. 13 shows an example of when a participant at the primary site has made a Japanese input. The left hand side shows a display at the primary site and the right hand side shows a display at the secondary site. When the participant at the primary site has input a Kana character string when the same windows 660-A and 660-B are being displayed as shown in (1), a character string 680-A input to only the primary site is displayed as shown in (2). When the participant at the primary site has executed a translation, a character string 680-A is translated into a Kanji string 690-A as shown in (3). When the participant at the primary site has executed an operation to confirm the translation, same Kanji strings 700-A and 700-B are displayed at both the primary site and the secondary site as shown in (4).

FIG. 14 shows an example of the case where the participant at the secondary site has made an input. When the participant at the secondary site has input a Kana string 680-B when the same windows 660-A and 660-B are being displayed as shown in (1), a character string 680-B input to only the secondary site is displayed as shown in (2). When the participant at the secondary site has executed a translation, a character string 680-B is translated into a Kanji character string 690-B as shown in (3). When the participant at the secondary site has executed an operation to confirm the translation, the same Kanji character strings 700-A and 700-B are displayed at both the primary site and the secondary site as shown in (4).

FIGS. 15 to 18 are diagrams for showing a method of inter-application communication between an application program 140 and a Japanese inputting front end program 710 when the Japanese inputting is going to be made during a local execution of the application program.

Figure 15:
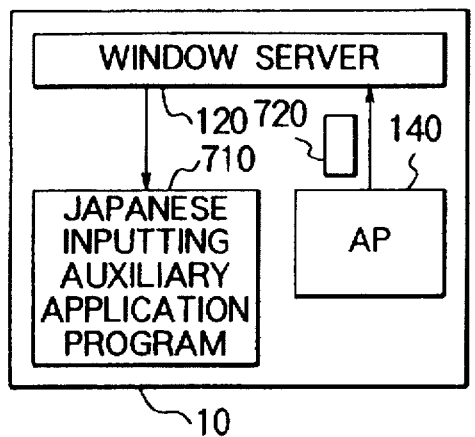
FIG. 15 is a diagram for showing the notification processing of the translation window identifier to the Japanese inputting front end program by the application program.

The application program 140 which is going to utilize the Japanese inputting front end program 710 at first notices a window identifier of a translation window to the Japanese inputting front end program 710 to register in the program 710. As shown in FIG. 15, the application program 140 transmits a translation window designating message 720 to the window server 120, and the window server 120 transmits the message to the Japanese inputting front end program 710.

Figure 16:
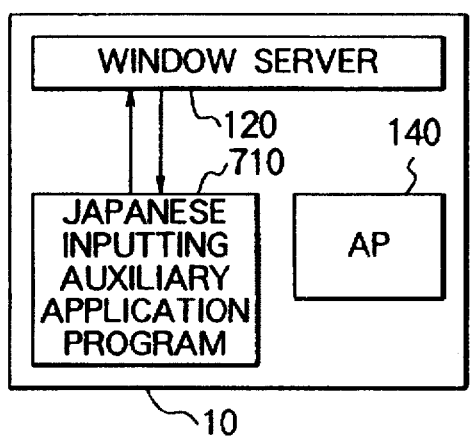
FIG. 16 is a diagram for showing the display processing during a translation by the Japanese inputting front end program.

As shown in FIG. 16, during the input of Japanese, the input to the translation window is received by the Japanese inputting front end program 710 and a request message is transmitted to the window server 120 to carry out a display during the translation.

Figure 12:
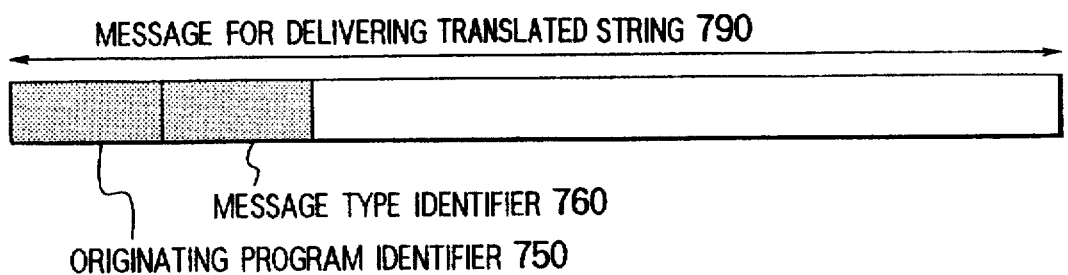
FIG. 12 is a diagram for showing an example of the configuration of the event message.
Figure 17:
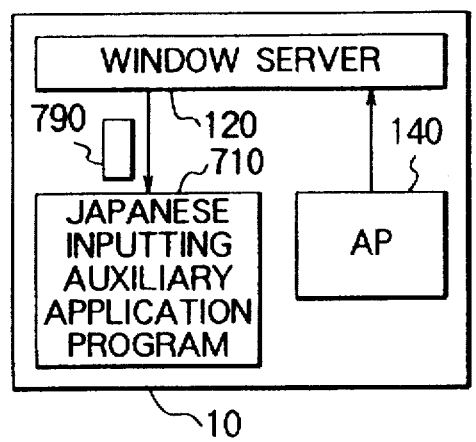
FIG. 17 is a diagram for showing the notification processing of the firm character string from the Japanese inputting front end program to the application program.

When the Japanese string 700 has been confirmed as shown in (4) of FIG. 11, the Japanese inputting front end program 710 transmits a translated string sending message 790 shown in FIG. 12 to the window server 120, and the window server 120 transmits the message to the application program 140, as shown in FIG. 17.

Figure 18:
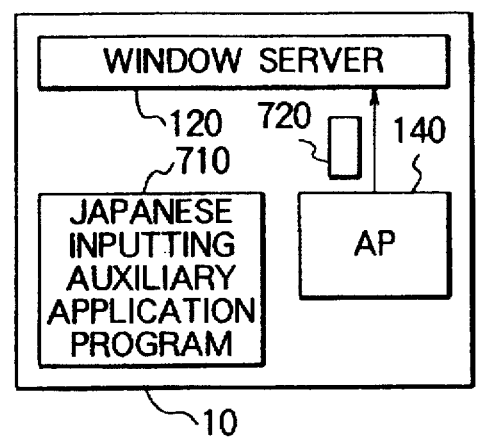
FIG. 18 is a diagram for showing the display processing of converted string by the application program.

As shown in FIG. 18, the application program 140 that has received the message 790 of the translated string transmits a character string display request message 720 to the window server 120 and displays the character string.

FIGS. 19 to 22 are diagrams for showing a method of inter-application communication between a cooperative execution application program 230 and a Japanese inputting front end program (an auxiliary program) 710 when the Japanese inputting is going to be made during a cooperative work by two participants.

Figure 10:
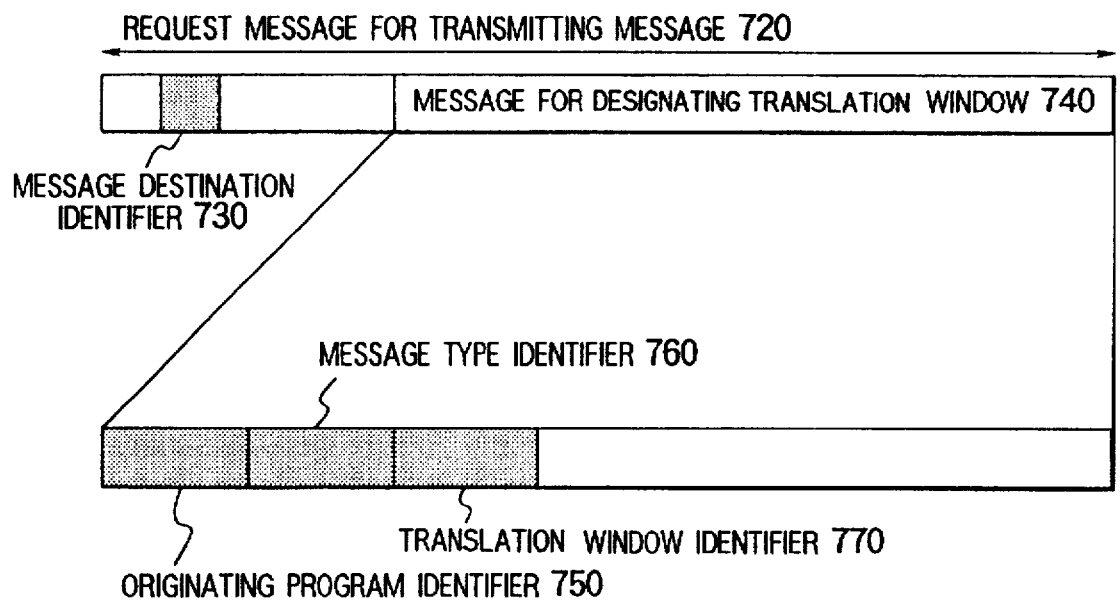
FIG. 10 is a diagram for showing an example of the configuration of the request message.

The configuration of an inter-application message 720 to be used between the application program 230 and the Japanese inputting front end program 710 is as shown in FIG. 10. The application program 230 transmits the inter-application message 720 to the server. The server transmits a translation window designation message body 740 included in the inter-application message 720 to the front end program 710 designated by a message transmission destination identifier 730. The application program 230 transmits a program identifier (P) of the Japanese inputting front end program 710 as a message transmission destination identifier 730. Only the transmission window designation message body 740 is transmitted to the Japanese inputting front end program 710.

The communication control program 130 converts server-dependent information included in the request message 720, that is, the message transmission destination identifier 730, an originating program identifier (P, Q) 750, a message type identifier (M) 760 and a transmission window identifier (W) 770 included in the inter-application message, by referring to the server-dependent information table 390, and transmits the inter-application message to the server.

Figure 19:
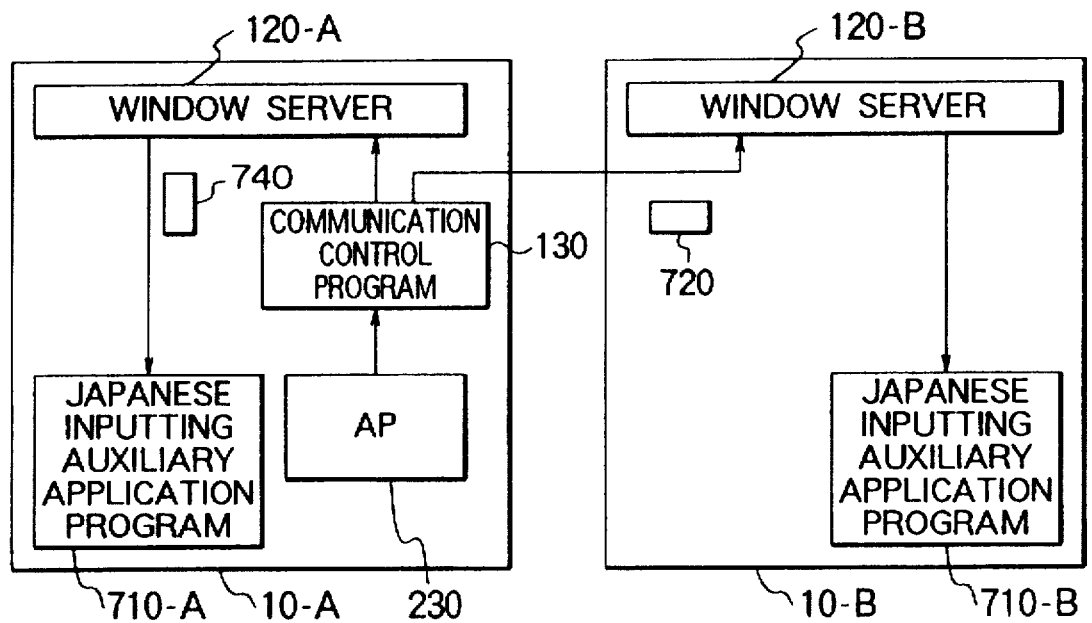
FIG. 19 is a diagram for showing the notification processing of the translation window identifier to the Japanese inputting front end program when the application program is being executed cooperatively.

As shown in FIG. 19, the application program 230 which utilizes the Japanese inputting front end program 710 at first registers in the Japanese inputting front end program 710. In this case, the application program 230 transmits the request message 720 of FIG. 10 and notices the window identifier 770 of the translation window and others. The application program 230 further transmits the translation window designation message 740 to the communication control program 130. The communication control program 130 properly converts the request message 720 and transmits the message to the two servers 120-A and 120-B. Each of the window servers 120-A and 120-B transmits the message 720 to the Japanese inputting front end programs 710-A and 710-B on the respective computers.

Figure 20:
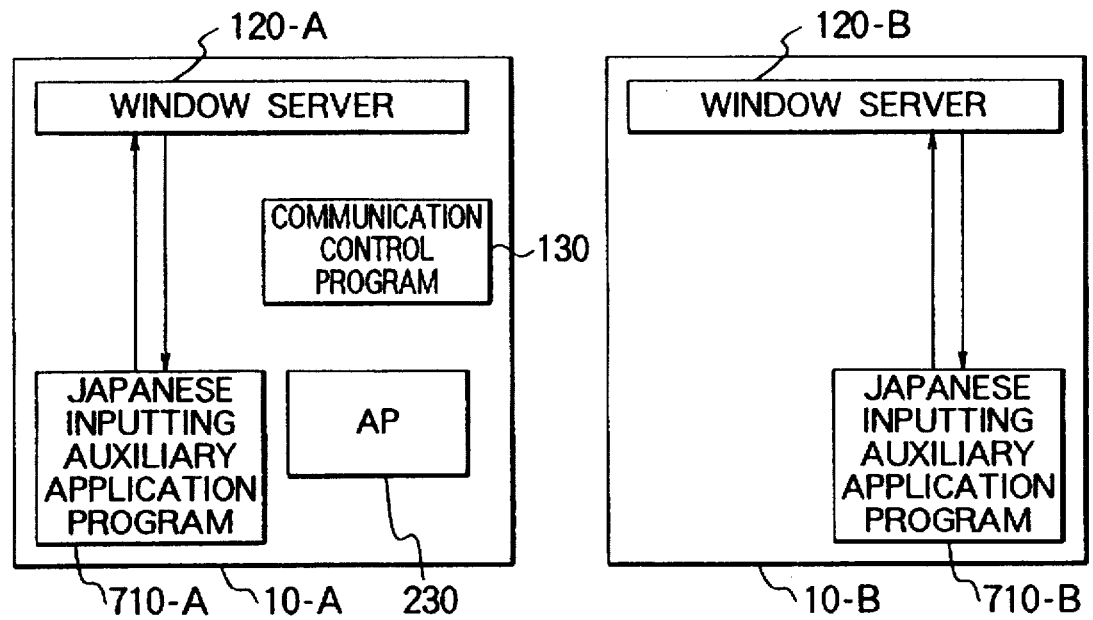
FIG. 20 is a diagram for showing the display processing of the translation by the Japanese inputting front end program when the application program is being executed cooperatively.

As shown in FIG. 20, during the input of Japanese at the primary site or the secondary site, the Japanese inputting front end programs 710-A and 710-B on the respective computers receive an input to the translation window and display the character string during the translation.

Figure 21:
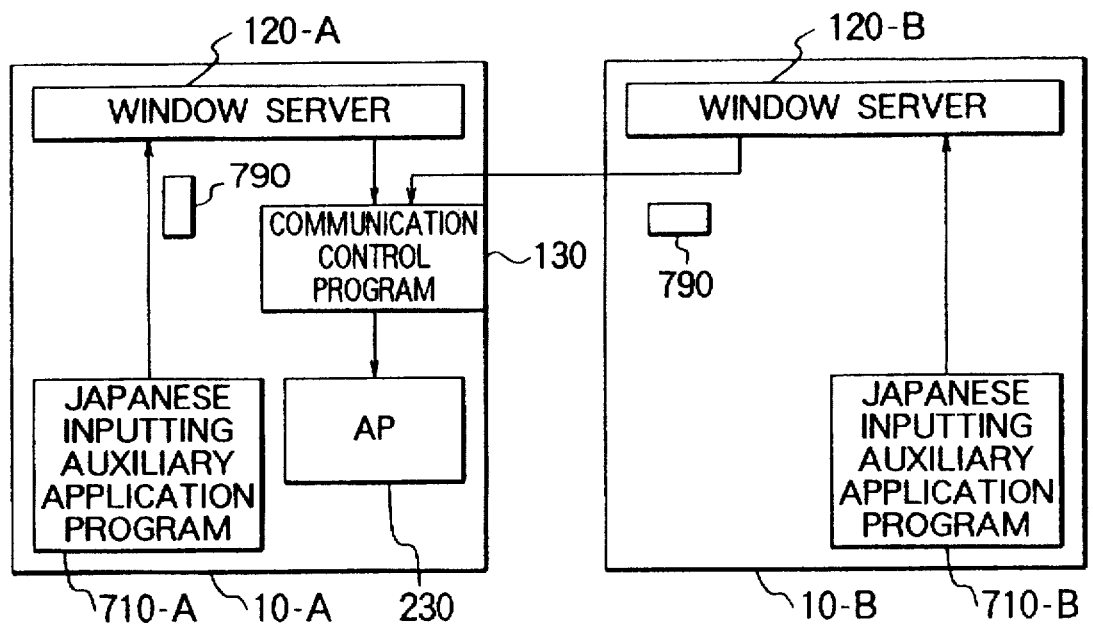
FIG. 21 is a diagram for showing the notification processing of the converted string from the Japanese inputting front end program to the application program when the application program is being executed cooperatively.

As shown in FIG. 21, when operation for confirming Japanese string has been carried out at the primary site or the secondary site, the Japanese inputting front end program 710 transmits a translated string sending message 790 shown in FIG. 12 to the window server 120 on the respective computers. The window server 120 transmits the message 790 to the communication control program 130 at the primary site. The communication control program 130 converts server-dependent information included in translated string notice message, that is, an originating program identifier (P, Q) 750 and a message type identifier (M) 760 included in translated character string notice message, and transmits the translated string message to the application program 230.

Figure 22:
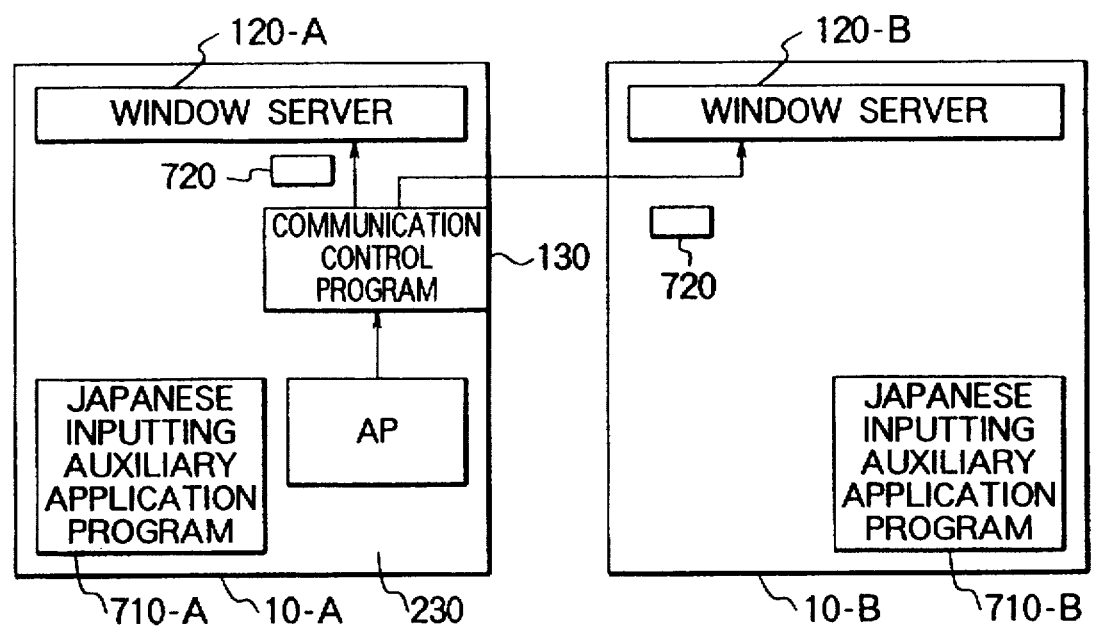
FIG. 22 is a diagram for showing the display processing of converted string by the application processing when the application program is being executed cooperatively.

As shown in FIG. 22, after receiving the translated string notice message 790, the application program 230 transmits the character string display request message 720 to the communication control program 130. The communication control program 130 properly converts the request message and transmits the message to the window servers 120-A and 120-B of the respective computers.

In the present embodiment, the Japanese inputting front end program has been used as an example of the local execution application program (an auxiliary program) which is executed under the primary server and the secondary server respectively. It is, however, needless to mention that it is also possible to convert a communication message between a window manager program and an application program which is cooperatively executed on the primary server, for example.

As a further separate embodiment, it is also possible to modulate the inter-application message conversion unit 360 in FIG. 3 and utilize the conversion unit 360 by adding and modifying the conversion unit for each corresponding local execution program. When this system is used, it is possible to execute inter-application communication by selecting a necessary program out of a plurality of local execution application programs such as the Japanese inputting front end program and the window manager program.

When the present invention is used, it is possible that an application program which is cooperatively executed at a plurality of sites can utilize an auxiliary program that is executed locally. For example, the cooperative execution application program can utilize a Japanese inputting front end program, so that all the participants can use Japanese inputting environments which are easy to use by each participant. Thus there is an effect that the efficiency of the cooperative work is improved.

Although the Japanese inputting front end program has been described as an example of the auxiliary program in the present invention, it is also possible to use an input program of other language or other auxiliary program having a function other than the character input function.

--Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A cooperative information processing method wherein an inter-application program message issued by an application program operating on a computer is transmitted to a window server operating on others of a plurality of computers, to cooperatively display a screen display of said application program on said plurality of computers, and a communication message generated as a result of an input to said application program issued by one of said plurality of computers is received and multiplexed and a multiplexed result is transmitted to said application program, to cooperatively execute said application program on said plurality of computers, said method comprising the steps of:

receiving said communication message generated as a result of the input to said application program by utilizing an auxiliary program which is a program executed locally in one of said plurality of computers for directly communicating with said window server without going through any other program;

based on predetermined server-dependent information on a format of a communication message of said inter-application program, interpreting a format of said communication message and converting said communication message to a communication message format for a server on a destination computer; and transmitting said converted communication message to said window server, to cooperatively execute said application program on said plurality of computers.

2. A cooperative information processing method according to claim 1, wherein said auxiliary program is a character inputting front end program.

3. A cooperative information processing method in a cooperative information processing system, having a plurality of computers connected with a communication network, and comprising a primary site in which an application program is executed, secondary sites which participate in a cooperative work of said application program, a server provided at each of said sites for processing communication between said sites, and communication control means for receiving a communication message issued by said application program, converting server-dependent information included in said communication message and broadcasting the communication message to said servers of all other participants, said method comprising the steps of:

receiving, in said communication control means, a communication message from said primary site;

utilizing a server-dependent information table provided in advance for managing a correspondence relationship of dependent information of each of said servers, interpreting said communication message generated as a result of input to said application program by utilizing an auxiliary program that is cooperatively utilized by said application program, for directly communicating with said each of said servers without going through any other program;

converting server-dependent information included in said communication message; and broadcasting said communication message to said servers of other participants.

4. A cooperative information processing method in a cooperative information processing system, having a plurality of computers connected with a communication network, and comprising a primary site in which an application program is executed, secondary sites which participate in a cooperative work of said application program, a server provided at each of said sites for processing communication between said sites, and communication control means for receiving a communication message generated as a result of input to said application program by utilizing an auxiliary program and issued by said application program, converting server-dependent information included in said communication message and broadcasting the communication message to said servers of all other participants, said method comprising the steps of:

managing, in said communication control means which has a server-dependent information table, a correspondence relationship of dependent information of each of said servers;

when a request message has been received from said application program:

converting said server-dependent information included in said request message by referring to said server-dependent information table at a server-dependent information conversion unit of said communication control means, executing a conversion processing of said request message at an inter-application message conversion unit, and transmitting said request message after conversion to said servers of said secondary sites; and when an event message has been received from one of said secondary servers:

converting server-dependent information included in said event message by referring to said server-dependent information table at said server-dependent information conversion unit of said communication control means, executing a conversion processing of said message at said inter-application message conversion unit, and transmitting said message after conversion to said application program.

5. A cooperative information processing method according to claim 4, wherein said communication control means receives a communication message issued by said application program, and by using a server-dependent information table provided in advance for managing a correspondence relationship of dependent information of each of said servers, interprets a communication message defined by an auxiliary program which is a program executed locally in one of said plurality of computers for directly communicating with said window server without going through any other program, and is cooperatively utilized by said application program, converts server-dependent information included in said communication message and broadcasts said communication message to said servers of other participants.

6. A cooperative information processing method according to claim 4, wherein said cooperative execution application program connects with an auxiliary program to be utilized, which is a program executed locally in one of said plurality of computers for directly communicating with said window server without going through any other program, and transmits to said auxiliary program server-dependent information including an identifier, position and size of a server window to be used for conversion by an inter-application communication, a window server program transmits a message to said auxiliary program, said auxiliary program transmits a converted string to said window server program as an inter-application message sending request, and said communication control means, which has received said message from said window server programs, converts an identifier of destination of said message and a message type identifier so as to be interpreted by said application program, by using said server-dependent information table, and then transmits said message to said application program.

7. A cooperative information processing apparatus wherein an inter-application program message issued by an application program operating on a computer is transmitted to a window server operating on other computers, to cooperatively display a screen display of one application program on a plurality of computers, and a communication message generated as a result of an input to said application program issued by one of said plurality of computers is received and multiplexed and a multiplexed result is transmitted to said application program, to cooperatively execute said application program on said plurality of computers, said apparatus comprising:

means for receiving said communication message generated as a result of an input to said application program by utilizing an auxiliary program which is executed locally in one of said plurality of computers for directly communicating with said window server without going through any other program;

means for interpreting a format of said communication message and converting said communication message to a communication message format for a server on a destination computer based on predetermined server-dependent information on a format of said communication message of an inter-application program; and means for transmitting said converted communication message to said application program, in order to cooperatively execute said application program on said plurality of computers.

8. A cooperative information processing apparatus in a cooperative information processing system, having a plurality of computers connected with a communication network, and including a primary site in which an application program is executed, secondary sites which participate in a cooperative work of said application program, and a server provided at each of said sites for processing communication between said sites, and each of said sites includes communication control means for receiving a communication message issued by said application program, converting server-dependent information included in said communication message and broadcasting to said servers of all other participants, wherein said communication control means comprises:

a server-dependent information table for managing a correspondence relationship of dependent information of each server; and an inter-application message conversion unit for receiving a communication message generated as a result of input to said application program by utilizing an auxiliary program and issued by said application program, interpreting said communication message defined by said auxiliary program which is cooperatively used by said application program for directly communicating with said window server without going through any other program, and converting server-dependent information included in said communication message.

9. A cooperative information processing apparatus including an application program, window servers and communication control means for controlling receiving and transmitting of a communication message with said application program which works cooperatively, wherein said communication control means includes:

a server interface unit connected with a plurality of servers corresponding to participants of said cooperative work;

a server-dependent information conversion unit for managing a correspondence relationship of server-dependent information, converting server-dependent information included in a request message according to a destination server, and properly converting server-dependent information included in an event message defined in advance by a window system, according to a transmission originating server, and a request conversion unit including an inter-application message conversion unit for interpreting said communication message and converting server-dependent information included in said communication message, an input conversion unit including said server-dependent information conversion unit and said inter-application message conversion unit; and a server-dependent information table storing a correspondence relationship in each server between server-dependent information defined by said window system and server-dependent information included in said communication message.

10. A cooperative information processing apparatus according to claim 9, wherein said server-dependent information table includes a program identifier and a message type identifier.

11. A cooperative information processing apparatus according to claim 9, wherein said request conversion unit, input conversion unit and server-dependent information table for executing an interpreting processing of said inter-application message can be added and modified as modules.

* * * * *